Aug. 3, 1937.                E. W. LEWIS                 2,088,710
            METHOD OF AND APPARATUS FOR PROJECTION PRINTING
                          Filed Jan. 9, 1936
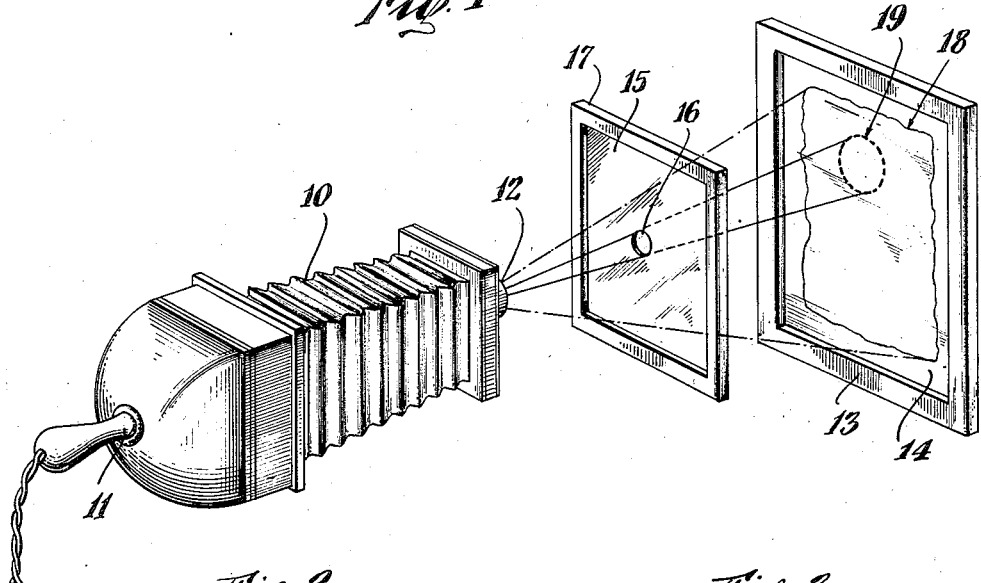
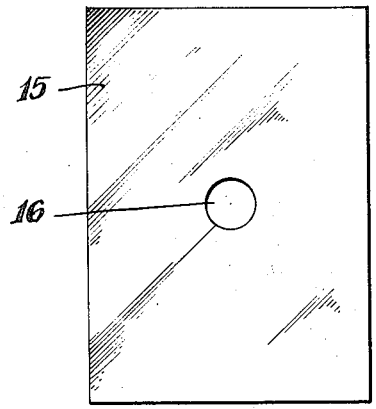
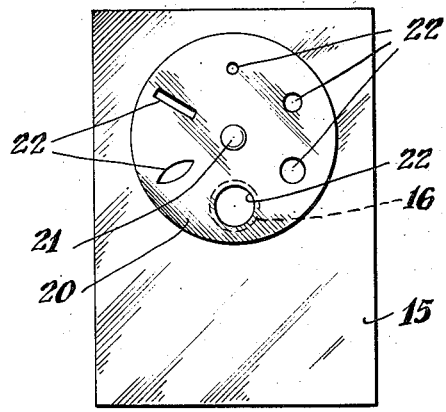
INVENTOR
Edwin W. Lewis
BY
Watson, Bristol, Johnson & Leavenworth
ATTORNEYS Patented Aug. 3, 1937

2,088,710

UNITED STATES PATENT OFFICE 2,088,710

METHOD OF AND APPARATUS FOR PROJECTION PRINTING

Edwin W. Lewis, Riverside, Conn.

Application January 9, 1936, Serial No. 58,265

6 Claims. (Cl. 88—24)

The present invention relates to projection printing and, more particularly, to a method of and an apparatus for use in local printing whereby enlargements are made with the use of a projection enlarger in a manner so that portions of a picture can be accentuated and undesirable details can be eliminated, controlled, or emphasized.

A general object of the invention is the provision of an improved method whereby local printing, such as "spot printing" and "vignetting" may be efficiently and simply performed, and an aperture board of novel construction for use in the practice of such improved method.

A more specific object of the invention is the provision of a method whereby a visible image may be cast by a projection enlarger upon a sensitized printing paper with the efficient screening out of actinic rays except in localized predetermined portions where accent is desired, with the use of a novel aperture board formed of material substantially impervious to actinic rays, having an aperture to allow passage of a beam of light including actinic rays, so that an image can be cast upon a sheet of sensitized printing paper and selected portions of the image effectively exposed to actinic rays.

A further object of the invention is the provision of such an aperture board having an aperture therein adjustable in size and/or shape for the passage therethrough of a beam of light including actinic rays.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawing, in which:

Fig. 1 is a perspective view of an apparatus used in the practice of and a diagrammatic illustration of the method of the present invention;

Fig. 2 is a plan view of one form of the aperture board of the present invention used in the practice of the method diagrammatically illustrated in Fig. 1; and Fig. 3 is a plan view of a modified form of the aperture board of the present invention.

In projection printing, it is desirable in making enlarged prints to accentuate certain portions of the picture and to eliminate or control the emphasis of other portions. This is commonly done by what is known as local printing which includes "spot printing" and "vignetting". Generally these consist of masking certain portions of the print while light from the projection enlarger is allowed to fall upon the sensitized printing paper in selected areas. This is usually done with an opaque aperture board which masks portions of the sensitized printing paper while allowing passage of a beam of light therethrough to desired portions of the picture to accentuate those portions. In the projection printing of pictures of people, the eyes, lips, hair border, both sides of the face, etc., are desirably "spot printed" in this manner. In a similar manner portions can be "vignetted". Such procedures are subject to difficulties since an image falling on the aperture board is unfocused and indistinct and constitutes the only means of guidance, requiring extreme skill by the operator to produce acceptable results. In addition, such an aperture board does not provide ready means for altering the size of the aperture which is necessary to obtain good results. These and other difficulties are eliminated by the present invention.

In accordance with the present invention, means are provided for screening out actinic rays, while casting a complete image upon the sensitized printing paper, with the use of an apertured screen of transparent material substantially impervious to actinic rays and having an aperture, preferably adjustable in size and/or shape, to allow passage therethrough of a beam of light including actinic rays to the printing paper whereby selected portions can be readily and efficiently spot printed and vignetted.

Referring to the drawing, like numerals refer to like parts throughout. In Fig. 1 is shown the usual projection enlarger 10 having a negative frame upon which is mounted a picture negative and including the usual projection light 11, and a lens 12. Opposite the lens 12 is positioned a printing frame 13 of usual construction upon which is supported a sheet 14 of sensitized printing paper. Between the lens 12 and the sheet 14 of sensitized printing paper is positioned an aperture board 15 having an aperture 16. The aperture board 15 is formed from a sheet of transparent material substantially impervious to actinic rays and, if desired, may be mounted in a suitable frame 17. With the aperture board 15 located between the projection enlarger 10 and the sheet 14 of sensitized printing paper, visible rays are transmitted therethrough to cast a complete image 18 upon the printing paper. Actinic rays which alone affect the sensitized printing paper will be screened out from all of the areas of the image 18 except that directly opposite the aperture 16, indicated at 19 in Fig. 1.

The size of the aperture in the aperture board 15 may be varied by mounting upon the aperture board a disk 20 of similar material rotatably mounted by a pivot pin 21 in a manner to cover the aperture 16 and provided with a plurality of apertures 22—22 varying in size and shape as shown so that the size and shape of the area of the sensitized printing paper which is subjected to a beam of light including actinic rays may be selectively adjusted.

Obviously the aperture board of the present invention and the method of use can be used and practiced with a vertical projector as well as the horizontal projector shown. In the former the projector is mounted on a suitable support with the lens directed downwardly and the printing paper frame is located therebeneath in a substantially horizontal position. The aperture board is then manipulated between the projector and the printing paper in a manner similar to that practiced with the use of the horizontal projector shown in the drawing.

In the practice of the present invention the aperture board allows a complete image of the picture to be cast upon the sensitized printing paper without affecting the same. Thus any desired portion of the image may be readily and easily spot printed by manipulation of the aperture board so that a beam of light including actinic rays passing through the aperture will accurately fall upon the selected portions of the image to be spot printed. One suitable material from which the aperture board may be formed is red cellulose acetate sheet sold under the trade name of "Kodaloid".

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. The method of local printing comprising manipulating between the lens of an enlarger and a sheet of sensitized printing paper an aperture board formed of transparent material substantially impervious to actinic rays having an aperture therein to allow passage of actinic rays whereby spot printing and vignetting of selected portions of a clearly defined guide image transmitted through the transparent material are performed in making a print.

2. The method of local printing comprising casting a complete and clearly defined guide image from an enlarger upon a sheet of sensitized printing paper through an aperture board of transparent material substantially impervious to actinic rays, and moving said board to cast a beam of light including actinic rays through an aperture in said board to said sheet of printing paper in selected portions of the transmitted guide image to spot print said printing paper.

3. The method of local printing comprising positioning between an enlarger and a printing frame an aperture board of transparent material substantially impervious to actinic rays, transmitting through said board a complete and clearly defined guide image from a negative in said enlarger to a sheet of sensitized printing paper supported by said frame, and moving said board to cast a beam of light including actinic rays through an aperture in said board to said sheet of printing paper in selected portions of the transmitted guide image to spot print said printing paper.

4. The method of local printing comprising casting a complete and clearly defined guide image from an enlarger upon a sheet of sensitized printing paper through an aperture board of transparent material substantially impervious to actinic rays, adjusting the size of an aperture in said board, and moving said board to cast a beam of light including actinic rays through the aperture in said board to said sheet of printing paper in selected portions of the transmitted guide image to spot print said printing paper.

5. An aperture board for use in local printing comprising a sheet of transparent material substantially impervious to actinic rays, having a relatively large aperture therein, and a second sheet of said material rotatably mounted on said first-mentioned sheet covering the aperture and having a plurality of apertures varying in size adapted to uncover portions of the relatively large aperture when said second sheet is rotated.

6. An aperture board for use in local printing comprising a sheet of transparent material substantially impervious to actinic rays having a relatively large aperture therein, and a disk of said material rotatably mounted on said sheet covering the aperture and having a plurality of apertures varying in size and shape adapted to uncover portions of the relatively large aperture when said disk is rotated.

EDWIN W. LEWIS.